INVENTOR.
RUDOLPH E. KRUEGER
BY
Christie, Parker & Hale
ATTORNEYS.

3,161,318
SEALING MEANS
Rudolph E. Krueger, 2446 N. Orchard Drive, Burbank, Calif.
Continuation of application Ser. No. 835,590, Aug. 24, 1959. This application Feb. 4, 1963, Ser. No. 256,503
9 Claims. (Cl. 220—46)

This invention is a continuation of my copending application Serial No. 835,590 filed August 24, 1959, and relates to sealing means for the closure of pressure systems including vessels and containers and particularly for the closure of such systems subjected to high pressures. This invention also encompasses a method of making sealing means.

The problems attendant upon sealing of closures in pressure systems to prevent fluid leakage, become particularly aggravated under high pressure conditions. Effective sealing of closures requires that no path for fluid flow be provided between the mating sealing surfaces. To block the minute flow passages which can exist because of irregularities in the mating sealing surfaces, the surface of a sealing means utilized to form a closure should be sufficiently deformable to enable it to conform to all such irregularities. Furthermore, to provide a reusable sealing means, the sealing means must possess a degree of resiliency so that it is not permanently set once a force is removed. The more conventional resilient materials, such as rubber, which generally meet these requirements are not usable under high pressure conditions because of the low shear strengths of such materials.

Metals have intrinsic strength properties which make their use advantageous as materials for construction of high pressure sealing means. Metallic sealing means become particularly necessary where high pressures are coupled with varying extremes of temperature. Present day technical developments result in operating environments of very high pressures under conditions of either very high or very low temperatures. The need for a reliable, tight closure under such severe operating environments demands sealing performances not found even in many metallic sealing means in prior use.

In my copending application, Serial No. 726,752, filed April 7, 1958, I disclosed a metallic sealing ring which provides effective sealing over numerous pressure cycles and under conditions of very high pressure. The metallic sealing ring therein disclosed comprises an annular spacer body and first and second annular legs extending from the spacer body toward the pressure to be sealed against. Each leg has a sealing portion diverging toward a separate sealing surface, each sealing portion being adapted to provide a line of sealing contact with its respective sealing surface at the point of extreme divergence of the leg. Several embodiments of the metallic sealing ring were disclosed in the above-identified copending application.

By orienting the above-described sealing ring so that its annular legs extend toward the pressure to be sealed against, a pressure responsive sealing ring is obtained. This results because increased pressure, for example, acts to urge with increased force the sealing portion against the sealing surface along the line of sealing contact. The use of a line of sealing contact achieves significant advantages. While this line has a finite area, the area is much less than where the conventional surface-surface contact of other devices is utilized. As a result, the total pressure exerted upon the sealing ring is transmitted through the relatively small surface area forming the line of sealing contact. A high unit pressure therefore urges the sealing portion against the sealing surface. This enables intimate flow-blocking contact between the mating surfaces.

I have now discovered a sealing ring which possesses the advantages heretofore discussed with respect to the sealing ring described in my above-identified copending application, and, in addition, possesses the advantage of simplicity and economy of construction. My present invention provides a sealing ring for a high pressure closure which comprises an annular spacer body and first and second annular legs extending in parallel spaced-apart relationship from the spacer body. Each leg has an inner and outer surface. A sealing lip projects from the outer surface of each leg at its extremity. Each sealing lip has an outer surface forming an obtuse angle with the outer surface of the leg and extending to a sealing tip. In combination with first and second joint members each having a sealing surface, the sealing tip of each sealing lip contacts a sealing surface to provide a line of sealing contact.

My invention also encompasses a combination of coatings which are particularly effective in providing a tight seal when applied to the sealing portion of the sealing ring of my present invention. The combination of coatings of my invention comprises a copper coating bonded to the outer surface of the sealing lip of the sealing ring described in the next preceding paragraph, an intermediate coating of a metal selected from the group consisting of silver and gold bonded to the copper coating, and a coating of a soft, deformable metal bonded to the intermediate coating. In the preferred embodiment of the coating of my invention, the deformable metal forming the outermost coating is tin.

The combination of coatings of my invention coacts to improve the sealing effectiveness of a sealing ring. The coating of copper provides a layer which furnishes strong adherence between the metal of the sealing ring, which is generally a stainless steel, and the outer coatings. The coating of a soft, deformable metal conforms under pressure to the irregularities of a mating sealing surface so as to block any minute flow passages. The intermediate coating of silver or gold not only protects the copper coating from oxidation but further acts as a spongy undercoating for the soft, deformable metallic coating. It has been found that where a metallic sealing ring according to my present invention has been subjected to high pressures and temperatures in excess of the melting point of the deformable metal, the latter metal was absorbed by the intermediate coating and retained in position. Under such conditions, in the absence of any intermediate coating between the coating of deformable metal and the metal of the sealing ring, the deformable metal would have flowed from the sealing portion of the ring.

While the combination of coatings of my invention has been described with reference to the metallic sealing ring of my present invention, it is to be understood that it is equally adapted to other sealing rings for high pressure closures.

My invention further encompasses a method for coating metallic sealing rings having an annular portion diverging from an annular body of the sealing ring and having a sealing portion adapted to provide a line of sealing contact with a sealing surface at the extreme point of divergence. The method comprises the steps of lapping said sealing portion to provide a flat surface, polishing the annular portion to remove minute striations and burrs and to round the edges of the flat surface, and bonding coatings to the flat surface to extend at least around the rounded edges of the flat surface. The steps prior to coating function first to remove minute burrs on the ring surface which, if not removed, would break through the applied coatings under sealing conditions and cause "galling" between the sealing ring and a sealing surface. Second, they function to remove discontinuities and sharp edges from the configuration of the sealing surface to which the coatings are applied. The application of coatings over discontinuities and sharp edges enhances the possibility of fluid leakage between the applied coating and the metallic surface of the sealing ring. This possibility of leakage is minimized by the practice of the method of my invention.

While this method is particularly useful in connection with coating of the metallic sealing rings of my invention, it will be appreciated that it can be advantageously employed in coating of surfaces of other sealing means. Furthermore, it can be utilized with coatings other than the coating of my invention, as for example, with plastic coatings such as polytetrafluorethylene.

The structure and advantages of the sealing ring of the present invention and the method by which it is formed will be more readily apparent from the following description taken in conjunction with the accompanying drawings, in which.

Figure 1:
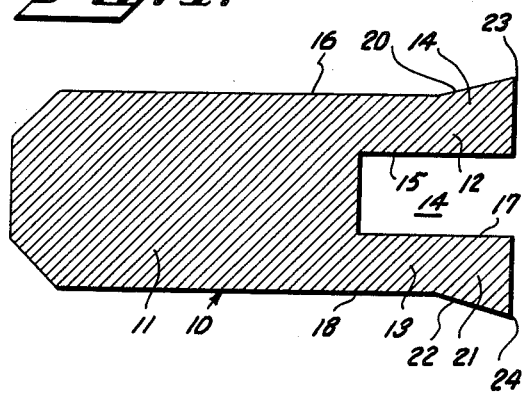
FIG. 1 is a sectional elevation of the sealing ring of my present invention.

With reference to FIG. 1, a sectional elevation of a sealing ring 10 according to my invention is shown. The sealing ring comprises an annular spacer body 11 from which extend a first annular leg 12 and a second annular leg 13. The annular legs are integral with the spacer body and are in a spaced-apart parallel relationship so as to define a hollow or annular groove 14 between them. Leg 12 has an inner surface 15 defining one side of the hollow and an outer surface 16. Leg 13 has an inner surface 17 defining another side of the hollow and an outer surface 18. Outer surfaces 16 and 18 of legs 12 and 13, respectively, co-extend in the same plane as the outer surfaces of the annular spacer body.

Near the extremity of leg 12 a sealing lip or annular portion 19 projects from the outer surface of the leg. Sealing lip 19 has an outer surface 20 which forms an obtuse angle with the outer surface of the leg. Near the extremity of leg 13, a sealing lip or annular portion 21 projects from the outer surface of leg 13 and has an outer surface 22 which forms an obtuse angle with the outer surface of leg 13. Preferably, the angle formed between the outer surface of each sealing lip and the outer surface of its associated leg is between 155° and 165°. Each sealing lip has a configuration which in cross section is substantially a right triangle. The hypotenuse of the right triangle is the outer surface of the sealing lip and the altitude of the right triangle is in the same plane as the outer surface of its associated leg. The angle formed opposite the altitude represents the extreme point of projection of the sealing lip. For sealing lip 19, this point is sealing tip 23. For sealing lip 21, this point is sealing tip 24. As shown in FIG. 1, the radial length of each of the outwardly diverging portions 19 and 21 is less than the radial depth of the annular groove in the body.

With respect to FIGS. 2 and 3, a sealing ring, identical to that described with reference to FIG. 1, is shown in a position to provide a closure between a cylinder 30 and a cover 31, a fragmentary portion of each being shown. The reference characters applied to the sealing ring of FIG. 1 are, where appropriate, applied to the sealing ring in FIGS. 2 and 3.

Figure 2:
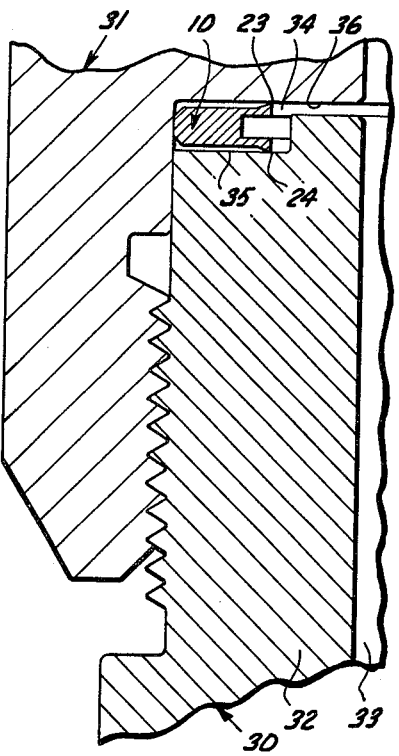
FIG. 2 is a fragmentary sectional elevation of a cylinder and cover showing the sealing ring of my present invention prior to application of pressure.

With reference to FIG. 2, a wall 32 of cylinder 30 defines an enclosure 33 which is filled with a fluid under pressure. A portion of the wall is externally threaded to receive mating internal threads of cover 31. An annular recess 34, formed in the upper end of wall 30, is defined in part by a first horizontal planar sealing surface 35. An inside horizontal surface of the cover constitutes a second planar sealing surface 36. Sealing ring 10 is positioned in recess 34 so that sealing tips 23, 24 are in contact with sealing surfaces 34, 35, respectively. Prior to complete tightening of cover 31 on cylinder 30, the annular spacer body of the sealing ring is not in contact with the sealing surfaces.

Figure 3:
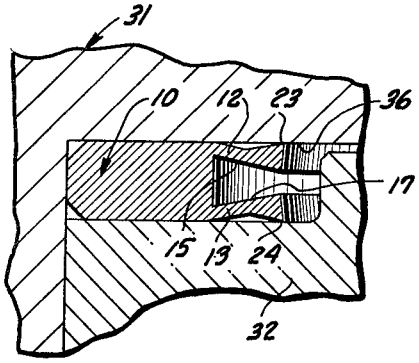
FIG. 3 is a fragmentary sectional elevation of the cylinder and cover of FIG. 2 showing the sealing ring following application of pressure.

With reference to FIG. 3, the sealing ring is shown after cover 31 is fully threaded onto wall 32 of the cylinder. The application of a force against sealing tips 23, 24 pivots annular legs 12, 13 of the sealing ring about the point at which the legs join the annular spacer body. Since the annular groove 14 is deeper than the radial length of the diverging portions of the legs, the legs are deflected like annular springs, as shown in FIG. 3. The sealing tips are urged against the respective sealing surfaces of the cover and the wall and mate in a line of sealing contact with these surfaces. Pressure of the fluid within enclosure 33 acts against inner surfaces 15, 17 of legs 12, 13, respectively. This total pressure is transmitted through the line of sealing contact between the sealing tips and the sealing surfaces. This pressure is additive to the tightening pressure resulting from threading cover 31 onto wall 32 of the cylinder. In this connection, the annular spacer body acts as a stop limiting the degree to which the cover is threaded onto the cylinder. Because the sealing ring of my invention is pressure responsive as previously described, the amount of tightening pressure required is reduced to a minimum.

When the enclosure pressure and tightening pressure are removed, the resiliency of the annular legs restores the sealing lips to substantially the unstressed position shown in FIG. 2. In this connection, the line of sealing contact enables design calculations for determining the proper amount of projection of the sealing lip above the outside surface of its associated leg so as to provide a reuseable seal even following plastic deformation. A line of sealing contact establishes a definite distance from the spacer body to the point of sealing contact. Through the ratio of the product of the unit pressure and said distance to the product of the area of sealing contact and the modulus of elasticity of the sealing ring material, the amount of "spring return" can be calculated.

It is to be understood that FIGS. 1–3 have been somewhat exaggerated for purposes of clarity in connection with the explanation of the structure and behavior of the sealing ring of my invention. In its preferred form, the extent of projection of the sealing tips above the outer surfaces of the legs is from 0.003 to 0.005 inch. It can be seen, therefore, that the degree of pivoting required to achieve the stressed position of the seal shown in FIG. 3 is substantially less than would appear to be the case from the drawings.

The sealing ring of my invention is preferably made from metals such as stainless steel or bronze. It is formed by machining. Where a coating of a deformable material is to be applied to the sealing portion of the sealing ring, I have found an improved method for treating the surface of the sealing ring to which the coating is applied. I have further found an improved combination of coatings for high pressure sealing effectiveness.

Figure 4:
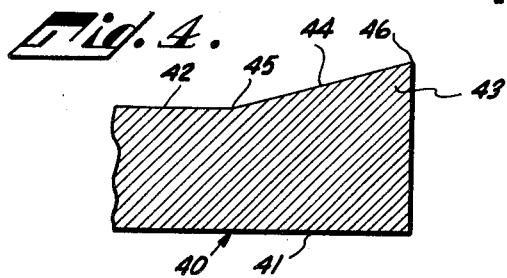
FIG. 4 is a fragmentary sectional elevation of one leg of the sealing ring shown in FIG. 1 following its formation by machining.
Figure 5:
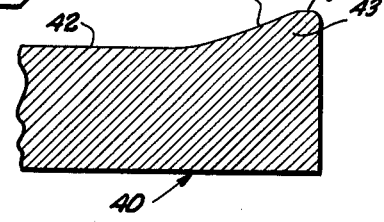
FIG. 5 is a fragmentary sectional elevation of the leg shown in FIG. 4 following lapping and polishing in accordance with the method of my invention.
Figure 6:
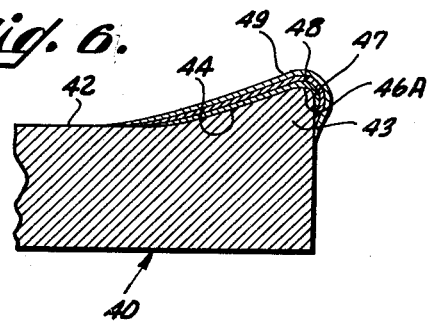
FIG. 6 is a fragmentary sectional elevation of the leg shown in FIG. 5 following application of coatings in accordance with my invention.

To illustrate the method of my invention and the combination of coatings of my invention, FIGS. 4–6 show in section a fragmentary portion of an annular leg 40 of a sealing ring identical to that described with reference to FIG. 1. The leg has an inner surface 41 and an outer surface 42. A sealing lip 43 projects from the outer surface of the leg. An outer surface 44 of the sealing lip intersects outer surface 42 of the annular leg at the discontinuity identified by the reference character 45. A sealing tip 46 is the extreme point of projection of the sealing lip.

FIG. 4 represents leg 40 and sealing lip 43 of the sealing ring following formation by machining and prior to treatment by the method of the present invention. FIG. 5 represents the leg and sealing lip following lapping and polishing according to the method of the invention. FIG. 6 represents the leg and sealing lip following application of the combination of coatings according to the invention.

With reference to FIG. 4 particularly, sealing tip 46 of the sealing ring is sharply defined. While this configuration represents an advantageous embodiment of the sealing ring of my invention, some difficulties are present in machining the sealing tip to the proper degree of definition. I have found it preferable, therefore, to produce a flat surface at the sealing tip by lapping the tip through the use of flat Carborundum stones or grit.

Accordingly, as a first step of the method of the present invention, the sealing tip is lapped to produce a flat surface as generally shown by reference character 46A in FIG. 5. Preferably, the width of the flat surface is from 0.003 to 0.010 inch. This flat surface enables attainment of a line of sealing contact. In an unstressed condition, such as the condition of the sealing ring shown in FIG. 2, the flat surface of each sealing lip is in contact with its respective sealing surface. In a stressed condition, such as the condition of the sealing ring shown in FIG. 3, pivoting of the annular legs, as previously described, results in pivoting of the flat surface so that the edge of each flat surface which is nearest the annular spacer body is urged in a line of sealing contact with the sealing surface.

As a second step of the method of the present invention, outer surface 44 of the sealing lip and flat surface 46A are polished with fine sandpaper to remove any ridges, burrs or striations existing in these surfaces. While polishing of outer surface 44 of the sealing lip may be extended to remove discontinuity 45 at the point of intersection between outer surface 44 of the sealing lip and outer surface 42 of the annular leg, as shown in FIG. 5, this is not essential to the practice of the method of my invention. It is sufficient if polishing of outer surface 44 is carried out to some point on said surface substantially removed from the inner edge of flat surface 46A. The polishing is also carried out to round the edges of flat surface 46A, as particularly shown in FIG. 5. Polishing in the manner herein described acts to remove ridges and burrs as well as sharp edges, the presence of which, under conditions of high pressure and temperature, would enhance the possibilities of "galling" of sealing surfaces and fluid leakage.

A sealing surface treated as hereinbefore described may be coated with any suitable deformable material which is bondable to the base metal of the sealing ring. When the combination of coatings of my invention is applied, a coating of copper 47 is bonded to the outer surface of the sealing lip. As shown in FIG. 6, the coating extends past the blended point of intersection between outer surface 44 of the sealing lip and outer surface 42 of the annular leg and around the outer rounded edge of flat surface 46A. Thereupon, an intermediate coating of silver or gold 48 is bonded to the copper and a coating of a soft, deformable metal 49 is bonded to the intermediate coating. While in practice it maybe convenient to coat the entire sealing ring in the manner described, it is only essential that the coating cover flat surface 46A and extend around the rounded edges of said flat surface.

The combination of coatings of my invention may be deposited electrically or chemically by conventional methods. The soft, deformable, metallic coating is preferably tin, although lead or bearing metal alloys may be used. The thickness of the copper coating is preferably between .0002 and .0003 inch; the thickness of the silver or gold coating is preferably about 0.00008 inch; and the thickness of the soft, deformable, metallic coating is preferably between 0.0001 and 0.0002 inch.

While the sealing ring of my present invention, treated by the method of my invention and having the combination of coatings of my invention, is a reuseable sealing means providing tight, repetitive sealing under conditions of high pressure and varying extremes of temperature, it is to be understood that the method and combination of coatings may be advantageously utilized individually with other sealing means.

I claim:

1. In a high pressure closure, the combination comprising first and second joint members each having substantially planar sealing surfaces adapted to be moved toward each other from an initial position to a final operative sealing position, an annular metal spacer body between the first and second joint members, first and second annular legs extending in parallel spaced-apart relationship from the spacer body, each leg having an inner and outer surface, the inner surfaces of the legs being parallel, the outer surfaces of the legs being parallel and each having a portion diverging toward a separate sealing surface to form a sealing lip projecting from the outer surface of each leg at its extremity, said sealing lip having an outer surface forming an obtuse angle with the outer surface of the leg and extending to a sealing tip when the sealing surfaces are in the initial position, said sealing tip of each sealing lip contacting a sealing surface of the first and second joint members respectively to provide only a line contact in final operative sealing position.

2. In a high pressure closure, the combination comprising first and second joint members each having substantially planar sealing surfaces adapted to be moved toward each other from an initial position to a final operative sealing position, an annular metal spacer body between the first and second joint members, first and second annular legs extending in parallel spaced-apart relationship from the spacer body, each leg having an inner and outer surface, the inner surfaces of the legs being parallel, the outer surfaces of the legs being parallel and each having a portion diverging toward a separate sealing surface to form a sealing lip projecting from the outer surface of each leg at its extremity, said sealing lip having an outer surface forming an obtuse angle with the outer surface of the leg and extending to a sealing tip when the sealing surfaces are in the initial position, the tip including a flat surface, the edge of said flat surface nearer the spacer body contacting a sealing surface of the first and second joint members respectively when the first and second annular legs are stressed by bringing the first and second joint members toward each other to provide only a line contact in final operative sealing position.

3. Apparatus in accordance with claim 2 including a copper coating bonded to the outer surface of the sealing lip to extend at least around the sealing tip, an intermediate coating of a metal selected from the group consisting of silver and gold bonded to the copper coating, and a coating of a soft deformable metal bonded to the intermediate coating.

4. Apparatus according to claim 3 in which the soft deformable metal is selected from the group consisting of tin and lead.

5. Apparatus according to claim 2 in which the edge of the flat surface nearer the spacer body is rounded where the outer surface of the sealing lip intersects the flat surface, a copper coating bonded to said flat surface to extend at least around its rounded edges, an intermediate coating of a metal selected from the group consisting of silver and gold bonded to the copper coating, and a coating of a soft deformable metal bonded to the intermediate coating.

6. Apparatus according to claim 2 in which the deformable metal is tin.

7. A metallic sealing ring adapted to fit between a pair of sealing surfaces and be subjected to stressed and unstressed conditions, the ring including an annular metal body, a pair of legs extending from the body in a direction generally parallel to the plane of the body, each leg having diverging portions with outer surfaces, the outer surfaces diverging from each other and extending toward a respective sealing surface at an acute angle in the unstressed condition, each of the outer surfaces appearing as a straight line when the legs are viewed in cross section, a separate flat annular portion on the extremity of the diverging portions of each leg and adjoining the respective said outer surfaces, the edge of each flat surface nearer the spacer body being rounded where it joins its respective outer surface to make only line contact with the adjacent respective sealing surface.

8. Apparatus in accordance with claim 2 wherein the edge of the flat surface nearer the spacer body is rounded where the outer surface of the sealing lip intersects the flat surface.

9. A metallic sealing ring adapted to fit between a pair of sealing surfaces and be subjected to stressed and unstressed conditions, the ring including an annular metal body, a pair of annular legs extending from the body in the same general direction, each leg having a diverging annular portion with an outer annular surface, the outer surfaces diverging from each other and extending toward a respective sealing surface at an acute angle in the unstressed condition, each of the outer surfaces appearing as a straight line when the legs are viewed in cross section taken in a plane normal to the annular body, a separate flat annular portion on the extremity of the diverging portions of each leg and adjoining a respective said outer surface, each annular flat portion appearing as a straight line when viewed in cross section taken in a plane normal to the annular body, the edge of each flat surface being rounded where it joins its respective outer surface to make only line contact with the adjacent respective sealing surface in final operative sealing position, and a layer of coating material on each said rounded part, the coating being softer than the metallic body.

References Cited in the file of this patent

UNITED STATES PATENTS

| | | |
|---|---|---|
| 1,339,636 | Tulloch | May 11, 1920 |
| 2,641,381 | Bertrand | June 9, 1953 |
| 2,898,000 | Haney | Aug. 4, 1959 |
| 3,042,248 | Krueger | July 3, 1962 |

FOREIGN PATENTS

| | | |
|---|---|---|
| 63,947 | France | May 4, 1955 |

(1st Addition 1,078,364)